May 8, 1962 J. A. LAWLER 3,032,981
NOISE SUPPRESSOR AND THRUST REVERSER FOR JET ENGINE NOZZLES
Filed Feb. 11, 1957 3 Sheets-Sheet 1

INVENTOR.
JOHN A. LAWLER
BY
Reynolds, Beach + Christensen
ATTORNEYS

May 8, 1962  J. A. LAWLER  3,032,981
NOISE SUPPRESSOR AND THRUST REVERSER FOR JET ENGINE NOZZLES
Filed Feb. 11, 1957  3 Sheets-Sheet 2

INVENTOR.
JOHN A. LAWLER
BY
Reynolds, Beach & Christensen
ATTORNEYS

INVENTOR.
JOHN A. LAWLER
BY
Reynolds, Beach + Christensen
ATTORNEYS

United States Patent Office 3,032,981
Patented May 8, 1962

3,032,981
NOISE SUPPRESSOR AND THRUST REVERSER
FOR JET ENGINE NOZZLES
John A. Lawler, Seattle, Wash., assignor to Boeing Airplane Company, Seattle, Wash., a corporation of Delaware
Filed Feb. 11, 1957, Ser. No. 639,459
15 Claims. (Cl. 60—35.54)

This invention relates to the control of gases exiting from the nozzle of gas stream reaction engines, such as the jet engines used for aircraft propulsion, for the purposes of (a) maintaining a high level of efficiency during cruising, (b) lowering the noise level, particularly in the lower frequency range, during and preceding take-off, and (c) effecting reversal of the thrust upon touching down. The invention will be shown and described herein in a form which is presently preferred, and which is used to illustrate the principles involved, and it will be evident that certain changes and modifications may be made in the individual elements, and in their relationship, within the scope of the novel principles disclosed, and that in particular various changes may be made in the structural and operational details, certain of which are shown herein in simplified or diagrammatic form.

In particular, this invention aims to accomplish the three objectives specified by a constructional arrangement which in a high degree is simple, and hence is likely to be rugged and reliable, and not likely to be adversely affected by the high temperatures and high velocity gas flow in the region of the exhaust nozzle of such an engine. This arrangement includes an annular terminus for the engine shell which is part of the engine housing, but separate from such shell and shiftable axially with respect thereto to open annular gaps of varying width, for intake of ambient air, or during thrust reversal, for discharge of reversed gases.

Noise suppression, and in some instances thrust reversal, has been dealt with by certain prior and co-pending patent applications, and reference is made to the same for an understanding of the general theory of operation of such devices, namely, to: Schairer, Ser. No. 562,050, now abandoned, filed January 30, 1956; Reinhart, Ser. No. 563,952, now abandoned, filed February 7, 1956; Reinhart, Ser. No. 563,953, filed February 7, 1956; Reinhart, Ser. No. 563,954, Patent No. 2,940,252, filed February 7, 1956; Grotz, Reinhart and Swanke, Ser. No. 634,106, filed January 14, 1957.

Noise suppression, as explained in the above-mentioned applications, is achieved in such jet engines by dividing the discharge stream into a plurality of separate or branch streams at the nozzle exit, each of smaller area than the aggregate undivided stream would be, and surrounded to the greatest extent possible by ambient air, which mixes therewith promptly and is warmed by, and is speeded up by the issuing high velocity branch streams. The division of the main jet into the number of smaller jets, well spaced apart, and the rapid speeding up of the mixing air, decreases objectionable noise in two ways, that is, by reducing the total noise level, and by shifting much of the residual noise to higher frequencies at which the effect on the human ear is less noticeable. The same principles underlie the present invention, but herein are combined with thrust reversing mechanism of novel type, and in a simple arrangement. The thrust reversing mechanism is integrated with and affects the construction and arrangement of the noise suppression mechanism, making of the whole a novel combination. In addition to the whole combination, certain parts or subcombinations are novel. The claims are directed to these several features of novelty.

Figure 1:
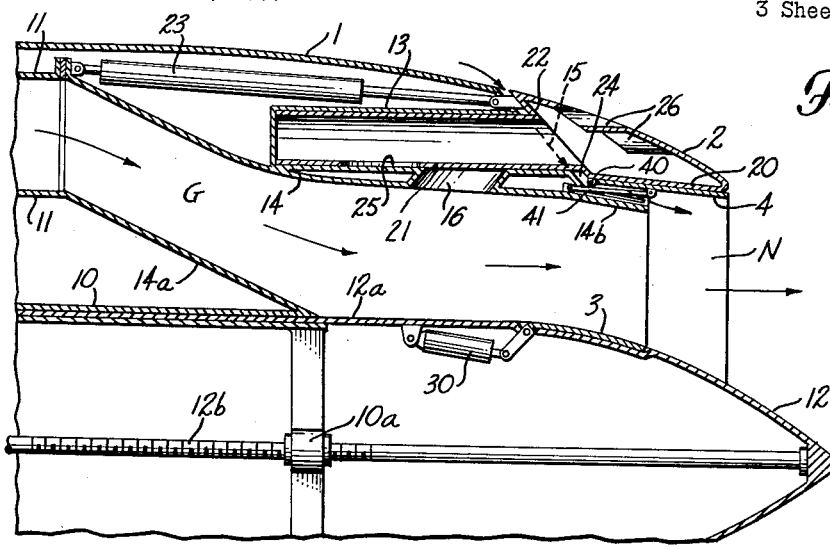
FIGURE 1 is an axial half-section through the nozzle portion only of a jet engine, embodying this invention, and shows parts set in the position for best efficiency during cruising, which position, however, is least effective for noise suppression.

The engine housing, of which only the tail end is shown, is represented as the rearwardly converging fixed exterior shell 1, of substantially circular cross-section. It houses an axially disposed island 10. Between the shell 1 and the island 10 is a duct 11, the contour whereof may vary widely, from the rear end whereof issue the combustion gases. Normally a tail cone 12 constitutes a rearward extension of the island 10, and defines between itself and the adjacent rear terminus of the shell 1 the annular jet nozzle N. The tail cone is not essential to the principal features of this invention, but if used is preferably adjustable in the axial direction with respect to the shell 1, wherefore it is provided with a forward cylindrical extension 12a, guided within the island; any suitable means to effect such adjustment may be employed, such as is represented by the nut 10a fixed to the island and a screw 12b, rotatable in either sense by an actuator not shown. Such structures are largely conventional and known in the art, and any suitable form thereof or substitute therefor may be employed.

The actual rear terminus of the shell 1 is not, according to this invention, integral with the shell, but is formed as an annulus 2, preferably hollow, of exterior shape to fair into the shell 1 ahead of it, when the terminus 2 is in its forward position, but this terminus 2 is mounted upon the shell 1 for shifting in the axial direction. The means to this end, and the mechanism for so doing, will be described shortly. It is desired to point out that the nozzle N is defined within the terminus 2, or between the tail cone 12, if one is used, and the interior peripheral wall 20 of this annulus or terminus 2, and is adjustable in effective area according to the relative axial adjustments of the tail cone and of the terminus 2, both whereof are axially adjustable.

The terminus 2 is preferably guided for axial movement by axially directed legs 21, rigid with and directed forwardly from the rear wall 22 of the terminus, guided in tubes or sleeves 13 fixedly positioned within the shell 1. Movement is accomplished by a suitable actuator, such as is represented by the hydraulic jack 23. Normally there would be a number of such guide means and actuators, distributed about the axis of the nozzle.

The exiting gases are conveyed from the duct or ducts 11 to the nozzle N by an annular duct G defined between the outer wall 14 and the tail cone 12 or its extension 12a, together with a conical wall 14a leading from 11 to the rear end of the island 10. The inward convergence of the duct G serves to increase the velocity of the exiting gases, and this effect can be further increased, in known ways, by varying its contour, size, or shape, as for example, by a further convergence of its rear end, at 14b.

Parts are shown in FIGURE 1 in the "cruise" relationship. During cruising maximum efficiency is desirable, but since the cruising altitude is high, noise reduction is of less concern than at lower altitudes, for the noise is attenuated by the distance from the ground, and other factors. In the position of parts shown in this FIGURE 1, the terminus 2 is almost wholly retracted forwardly, as is the tail cone 12, leaving a nozzle N of substantially maximum area, whence issues a cone of gas of maximum and concentrated area, and of maximum length. These conditions are such as favor the greatest volume of noise, at the most objectionable level, but the same are tolerable when at cruising altitude. Nevertheless, an appreciable although relatively minor reduction in noise is attainable by inducing the formation of a shroud of warmed, quickly accelerated ambient air about the cone of issuing gas. It is for this purpose that the terminus 2 is projected slightly rearwardly from the rear end of the shell 1, to open a narrow annular gap 24 between the forward wall 22 of the terminus 2 and the matching rear wall 16 of the shell 1. As is shown by the arrows in FIGURE 1, the exiting gases at the nozzle N induce an inward flow of air through the gap 24. This air begins to mingle with the gas just within the nozzle, where turbulence is in any event a maximum, is warmed by the gas, and is speeded up to lessen subsequent turbulence and noise, and forms a noise-deadening shroud to some distance rearwardly of the nozzle.

Figure 2:
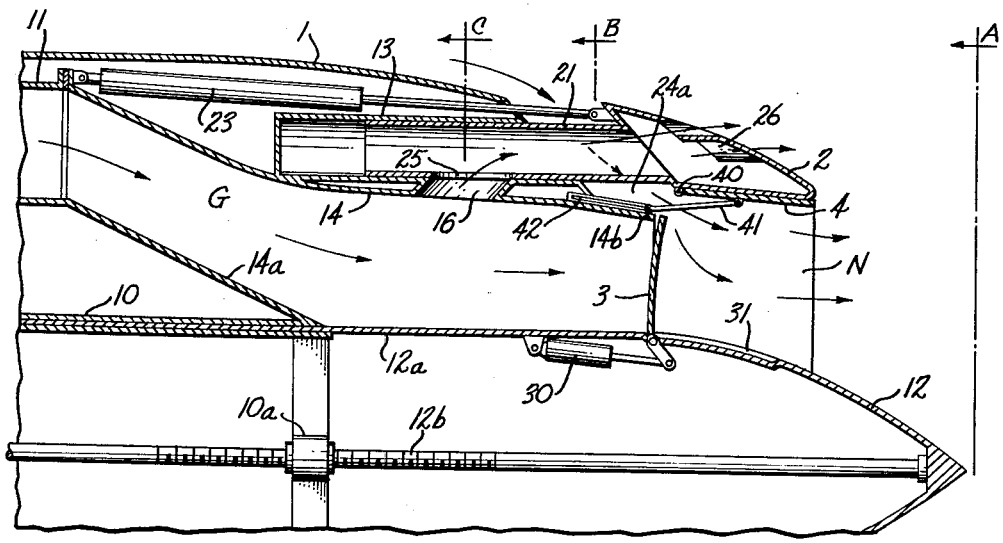
FIGURE 2 is a similar view, but with parts in the position for take-off, at a time when noise suppression is especially desirable, yet reduction in thrust produced can not be permitted.

Both the legs 21 and the annulus 2 are preferably hollow. Each leg is apertured at 25, in its radially inner surface, and in the take-off position of the parts, only, as shown in FIGURE 2, the apertures 25 register with bleed ducts 15 in the wall 14 of the gas duct G. The gases so bled off, which constitute a part only of the total being exhausted, exit from the interior of the annulus 2 by means of a large number of separated individual jet apertures 26, surrounding and spaced outwardly of the nozzle N. This affords additional nozzle area, and divides the jet into multiple jets for noise suppression.

Figure 5:
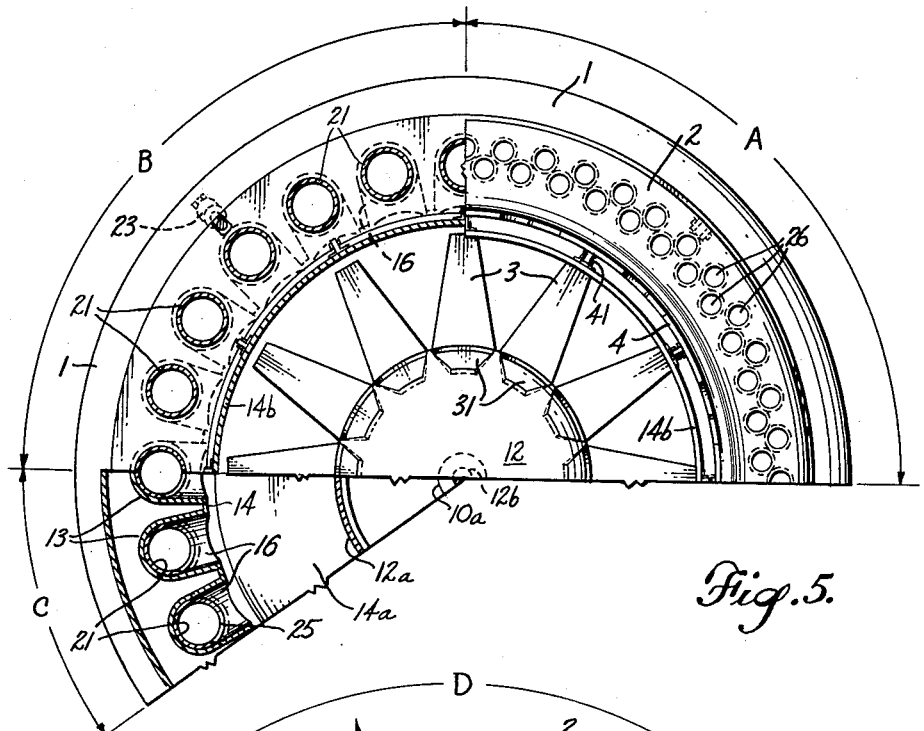
FIGURE 5 is a view looking forward along the axis of the nozzle, showing an end elevation and stepped segmental sections along the lines designated A, B, and C in FIGURE 2, and with the parts in the corresponding positions.

The need for such additional nozzle area is understood when it is realized that during take-off (as in FIGURE 2) gas stream divider vanes 3 are projected by suitable actuators, represented by the hydraulic jack means 30, from their normal retracted position, flush within recesses 31 in the tail cone, into a position transverse to the gas stream within the nozzle N. These vanes 3 of generally trapezoidal shape (see FIGURE 5) and of a length to reach substantially to the rear edge of the outer wall 14 of the duct G, where it converges inwardly at 14b, with a narrow edge pivoted upon the tail cone 12 at an end of the recess 31, and a still narrower edge outermost, divide the annular nozzle N into a plurality of separated individual nozzles. Moreover, in this position of the parts the formerly narrow gap 24 has been widened, by the further rearward displacement of the terminus 2, to define the wider gap 24a (compare FIGURES 1 and 2) through which enters air to separate and tending to maintain separation between the individual gas streams between adjacent vanes 3, and to suppress the noise in accordance with known principles. The lessened nozzle area occasioned by the divider vanes 3, and to some degree by the rearward projection of the tail cone 12 and its extension 12a, is compensated for by the increased area afforded through the bleed ducts 15, hollow legs 21, hollow annulus 2, and exit jet apertures 26, as explained above. There being no diminution of total gas exit area, no appreciable lessening of thrust occurs. The total noise generated is materially less than in the cruise condition, and the noise level is confined to the less objectionable upper part of the noise spectrum, as a result of division of the exiting gases into numerous small individual jets, and of their maintenance in separated status during maximum turbulence, and while being cooled by admixture with the ambient atmosphere surrounding and/or separating the individual jets so divided. The vanes are represented as mounted upon the tail cone, but they might equally well be mounted upon the wall 14b. In such case the tail cone might even be omitted. The shape of the stream divider vanes 3 may vary, as is suggested in certain of such prior applications.

The thrust reversing condition is of short duration, and notwithstanding that noise reduction would be highly desirable, because the airplane is ground borne during thrust reversal, and production of near maximum thrust is probable, nevertheless the reduction of noise during thrust reversal is of less consequence than the assurance of reversal of thrust to an adequate degree, by simple mechanism consonant with the attainment of noise reduction during take-off conditions, and with the attainment of maximum efficiency during cruising. There is, therefore, no provision for noise reduction during thrust reversal, other than such as may be incident to the reversing of the thrust, and to certain turbulence-creating obstructions within the reverse thrust gap.

Figure 6:
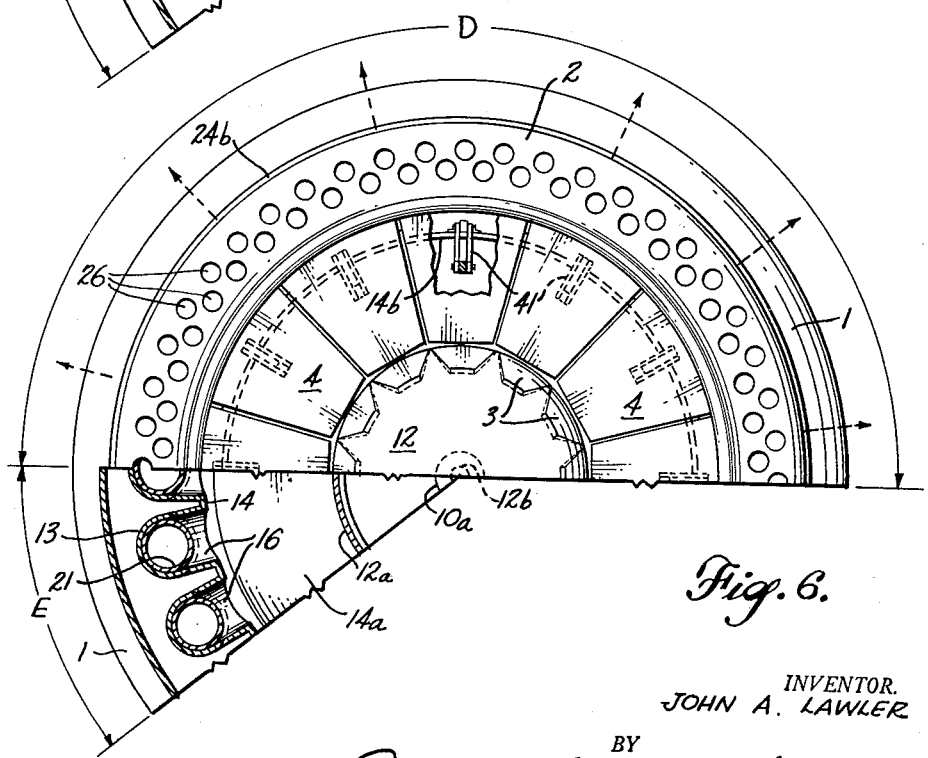
FIGURE 6 is a view similar to FIGURE 5, but with the stepped segmental sections along the lines designated D and E in FIGURE 3.

The approach condition which precedes touching down and thrust reversal coincides more or less with the cruise condition illustrated in FIGURE 1. The thrust reversing condition is illustrating in FIGURES 3 and 6. The reversal of thrust is accomplished primarily by interposing a plurality of flaps 4, which collectively block the entire nozzle N, between the terminus 2 and the tail cone 12, and simultaneously opening a wide gap 24b around the rear edge at 14b of the gas duct G, and leading thence outwardly and forwardly between the inclined forward wall 22 of the annular terminus 2 and the complementally inclined rear wall 15 of the shell 1. Movement of the flaps 4 from their stowed position close alongside the inner peripheral wall 20 of the annulus 2, to which the flaps 4 are pivoted at 40, into their radially inwardly directed thrust reversing position, may be accomplished in any convenient manner. An actuator energizable at will to this end may be provided, but the simplest and preferred manner of effecting such inward movement of the flaps 4 into their operative position, and later of effecting outward movement thereof into their stowed or retracted position, is to connect the rear end of links 41 to the flaps 4, the forward end of such links being slidable in fixed longitudinal slots 42, located exteriorly of the wall 14, 14b, which constitute lost motion mechanism. The length, location, and orientation of the slots 42 is such that the movement of the annular terminus 2, under the influence of its actuator 23, from its cruising position (FIGURE 1) to and including its take-off position (FIGURE 2) will not effect movement of the flaps 4. The forward end of the links 41 will merely slide idly in the respective slots 42, and the rearward movement of the air through the gap 24, or through the wider gap 24a, will prevent any inward movement of the flaps 4, wherefore the latter are retained in their stowed position, close against the inner peripheral wall 20.

Figure 3:
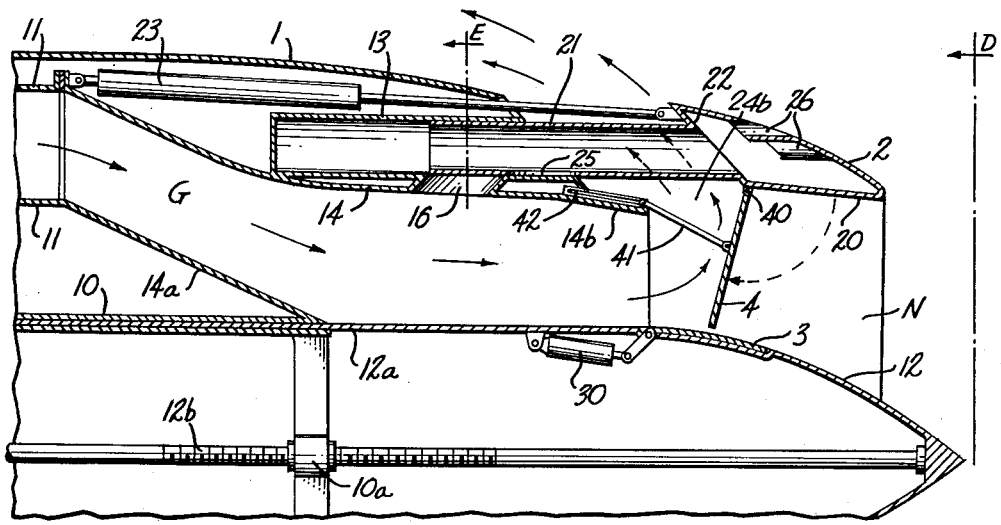
FIGURE 3 is a similar view, with parts now in the position for thrust reversal after touching down, when noise suppression although desirable is not essential because of the short period of time involved.
Figure 4:
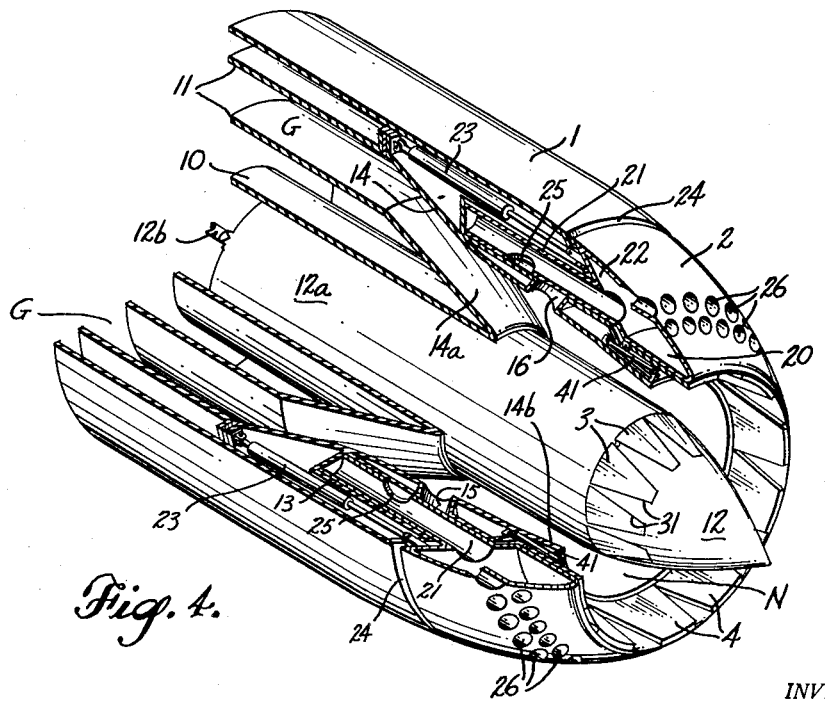
FIGURE 4 is an isometric view, partly broken away, showing parts in the position corresponding to FIGURE 1.

Upon movement of the terminus 2 to the rear of the position it occupies in FIGURE 2, under the influence of the actuator 23, to open the wide gap 24b, the links 41, having already reached the rear end of the slots 42, draw the flaps 4 positively inwardly, until they reach their projected position in FIGURE 3. In this position they collectively block the rearward exit of gases, but since the gap 24b is now wide open, the flaps 4 direct the gases outwardly and forwardly through this gap, to produce a rearward thrust. Ordinarily the tail cone 12 will have been shifted rearwardly, to insure substantially complete closing of the nozzle N. The movement rearwardly of the terminus 2 to its extreme rearmost position interrupts registry between the bleed ports 15 and the interior of the hollow legs, so that there can be no diversion of gases rearwardly through the small jets 26. Nor is there probability of interference between vanes 3 and flaps 4. The vanes are projected into the nozzle N only during take-off, and are retracted for cruising, and the flaps are projected only after touch down from cruising.

The numerous legs 21, spanning the gap 24a, each of large cross section and closely spaced, tend to create a very considerable degree of turbulence before the gases issue to the atmosphere. This turbulence, and the division of the gases as they exit past these legs, tends to promote early admixture of the reversed gases and the circumambient air, and heat transfer to the air, which in turn assists somewhat in lowering the noise level, and in attenuating the noise, to render it less objectionable.

Various elements are shown diagrammatically, and no attempt has been made to show hydraulic lines, control valves, or interconnections between different actuators or controls. Such may be conventional, or conventionally arranged, and operating interconnections may be arranged if desired. The invention does not reside in such details, but rather in the combination as a whole, whereby relatively simple and integrated mechanism enables the jet stream to be controlled for cruising, for noise suppression when most necessary, and for thrust reversal.

I claim as my invention:

1. A combined noise suppressor for use with a gas stream reaction engine, comprising, in combination with an engine housing including an exterior shell enclosing a gas duct and an annular terminus separate from and guided upon the rear end of said shell for relative longitudinal movement, and defining an open rear nozzle for discharge of the gas stream from the gas duct, said terminus by its rearward movement opening an annular gap between itself and the rear end of the shell, a plurality of gas stream divider means supported for movement between a retracted position, wherein they are out of the gas stream, and a projected position transversely of the gas stream and forward of the gap, said means being spaced apart, when projected into the gas stream, to divide the same into a plurality of individual and smaller jets with intervening spaces, the circumambient air entering through the gap into the several spaces behind said stream divider means, and passing rearwardly therebetween to maintain separation between such individual jets until they exit from the open rear nozzle, means to bleed off a part of the gas stream ahead of the stream divider means, a plurality of small apertures communicating with said bleed-off means, and arranged to discharge the bled-off portion rearwardly, exteriorly of the nozzle, as a plurality of small individual jets, the aggregate area of which plus the area of the divided gas stream approximates the area of the undivided gas stream, said bleed-off means being operatively connected to the terminus for closure except when the terminus is in a given gap-forming position, and means which shift the terminus longitudinally into selected positions, in one of which the bleed-off means is open, and which also shift the stream divider means at such time into projected position, and back at will to retracted position.

2. A combined noise suppressor and thrust reverser for use with a gas stream reaction engine, comprising, in combination with an engine housing including an exterior shell enclosing a gas duct and an annular terminus separate from and guided upon the rear end of said shell for relative longitudinal movement, and defining an open rear nozzle for discharge of the gas stream from the gas duct, said terminus by its rearward movement opening an annular gap between itself and the rear end of the shell, a plurality of gas stream divider means supported for movement between a retracted position, wherein they are out of the gas stream, and a projected position transversely of the gas stream and forward of the gap, said means being spaced apart, when projected into the gas stream, to divide the same into a plurality of individual and smaller jets with intervening spaces, the circumambient air entering through the gap into the several spaces behind said stream divider means, and passing rearwardly therebetween to maintain separation between such individual jets until they exit from the open rear nozzle, means to bleed off a part of the gas stream ahead of the stream divider means, a plurality of small apertures communicating with said bleed-off means, and arranged to discharge the bled-off portion rearwardly, exteriorly of the nozzle, as a plurality of small individual jets, the aggregate area of which plus the area of the divided gas stream approximates the area of the undivided gas stream, said bleed-off means being operatively connected to the terminus for closure except when the terminus is in a given gap-forming position, a plurality of thrust reversing means which block exit of the gas stream from the nozzle, said thrust reversing means being supported for movement between a retracted position, wherein they are out of the gas stream, and a projected position behind the gap, wherein they block the exit of gases and direct the same outwardly through the gap, and means which shift the terminus longitudinally, and the stream divider and thrust reversing means respectively between their projected and retracted positions.

3. The combination of claim 2, wherein the shifting means is operatively connected to the terminus, and an operative connection between the terminus and the thrust reversing means, said operative connection including lost motion means, to shift the thrust reversing means automatically into its projected position by final movement of the terminus into its rearmost position, but the lost motion means permitting rearward gap-opening movement of the terminus, short of such final movement, without shifting of the thrust reversing means from its retracted position.

4. In combination with the housing of a gas stream reaction engine, including a longitudinally directed shell enclosing a gas duct, a terminal nozzle-defining element separate from and mounted upon the rear end of said housing and movable longitudinally relative to the shell between a rear position wherein a circular gap communicating with the gas duct is opened between the shell and the terminal element for induction of ambient air to be discharged through said terminal element, and a forward position wherein such gap is substantially closed, angularly spaced gas stream divider means distributed in a circle about the gas duct ahead of the gap, and movable between a retracted position, wherein they are out of the gas stream, and projected, angularly spaced positions within the gas stream, with spaces therebetween to which the gap admits inducted air, said gas stream divider means, by their location ahead of the gap, and by the entrance of air into the intervening spaces, dividing the gas stream into a plurality of individual jets separated by the inducted air, and so issuing from the nozzle, duct means in said terminal element, communicating with the gas duct in the shell, and defining auxiliary passage means for rearwardly directed gases, means which shift the terminal element longitudinally between its forward and rear positions, and the stream divider means correspondingly between their retracted and projected positions, and closure means for said auxiliary passage means which move into open position by movement of the terminal element into gap-forming position.

5. A combined noise suppressor and thrust reverser for use with a gas stream reaction engine, comprising, in combination with an engine housing including an exterior shell enclosing a gas duct, an annular terminus separate from and guided upon the rear end of said shell for relative longitudinal movement, constituting a rearwardly directed nozzle for normal exit of gases from said gas duct, and by its movement in the rearward sense opening an annular gap between itself and the rear end of the shell, a plurality of gas stream divider vanes distributed circumferentially about the gas duct and supported for movement between a retracted position, wherein they are out of the gas stream, and a projected position within the gas stream, forward of the gap, and disposed transversely of the nozzle, said vanes being shaped to divide the issuing gas stream into a plurality of smaller individual jets, when the vanes are in their projected position, and the circumambient air entering through the gap and passing into the spaces between the vanes maintaining separation between such individual jets, means defining a plurality of bleed ports opening from the gas duct ahead of said vanes, means controlled by longitudinal movement of the terminus to open said bleed ports when the vanes are in their projected positions, a plurality of individual small area-compensating ports directed rearwardly, externally about the nozzle, and communicating with said bleed ports for discharge of bled-off gases, thrust reverser flaps distributed about the gas duct and supported for movement between a retracted position, wherein they are out of the gas stream, and a projected position behind the gap, wherein they are disposed transversely of the nozzle, said flaps being shaped to collectively block exit of gases through the nozzle when they are in their projected position, and to direct the gases outwardly and forwardly through the gap, and means to shift the terminus forwardly and rearwardly, and the vanes and flaps respectively between their projected and retracted positions.

6. In combination with a hollow, longitudinally directed jet engine housing open at its rear end to define a jet nozzle, an annular terminus separate from and formed as a rearward continuation of the housing and jet nozzle, hollow legs spaced about and extending forwardly from said annular terminus, and guided in said housing for movement in the axial direction together with the terminus to open or substantially to close an annular gap between the housing and the terminus, each such leg and the housing having cooperating apertures located to come into registry for communication with the jet nozzle when the terminus is moved rearwardly relative to the housing into an intermediate position, and to be displaced from registry by full forward and rearward movements of the terminus, the terminus having apertures surrounding its central opening and communicating with the hollow legs for rearward discharge of gases entering through the apertures in the legs and the housing when in registry, stream divider means located in a circle ahead of the gap and shiftable in coordination with shifting into registry of the leg and housing apertures, from a retracted position to spaced-apart operative positions transversely of the jet nozzle, and blocking means distributed in a circle and located behind the gap and shiftable in coordination with shifting of the annulus into its full rearward position, from a retracted position to an operative position transversely of the jet nozzle.

7. In combination with the housing of a gas stream reaction engine, including a longitudinally directed shell enclosing a gas duct, and having ports directed outwardly from such gas duct, a terminal nozzle-defining element separate from, disposed to the rear of, and mounted upon the rear end of said shell for movement longitudinally, relative to the shell, between a rear position wherein a circumferential gap is opened between the shell and the terminal element, for induction of ambient air to be discharged through said terminal element, and a forward position wherein such gap is substantially closed and the gases alone exit rearwardly from the gas duct through said element's nozzle, hollow legs open at their rear end to atmosphere, extending rearwardly from and movable with said terminal element, and ported for communication with said ports in the shell when the terminal element is in its rear, gap-forming position, but to occlude said ports in the shell when the terminal element is in its forward position, gas stream divider means distributed circumferentially about the gas duct ahead of the gap, and supported from the shell and movable between a retracted position, wherein they are out of the gas stream, and projected, angularly spaced positions within the gas stream and forward of the gap, to divide the gas stream into a plurality of individual jets separated by air inducted through the gap, and means which shift the terminal element longitudinally between such two positions, and stream divider means between their projected and retracted positions.

8. A noise suppressor for use with a gas stream reaction engine, comprising, in combination with an engine housing including an exterior shell enclosing a gas duct and open at its rear end to define a jet nozzle for discharge of gases from the gas duct, an annular hollow ring constituting a terminus for the rear end of the shell, but separate therefrom, axially directed hollow legs extending forwardly from said terminus, guide tubes in the rear end of the shell receiving said legs, supporting and guiding the terminus for longitudinal movement, to open a gap between the shell and terminus by relative rearward movement of the latter, cooperating ports in the guide tubes and the legs, which when in registry afford communication between the gas duct and the interior of the hollow ring, a plurality of individual rearwardly directed jets distributed about the hollow ring and leading from its interior, a plurality of gas stream divider vanes distributed in a circle about the gas duct and supported from the engine housing and movable between a retracted position, wherein they are out of the gas stream, and a projected position within the gas stream and forward of the gap, wherein they are disposed transversely of the nozzle, said vanes being spaced apart and shaped to divide the issuing gas stream into a plurality of smaller individual jets when the vanes are in their projected position, the circumambient air entering through the gap and passing through the spaces between the vanes acting to maintain separation between such individual jets, means which shift the terminus to bring the ports in the guide tubes and legs into registry when the stream divider vanes are projected, and means which shift the vanes between their retracted and projected positions.

9. A combined noise suppressor and thrust reverser for use with a gas stream reaction engine, comprising, in combination with an engine housing including an exterior shell enclosing a gas duct and open at its rear end to define a jet nozzle for discharge of gases from the gas duct, an annular hollow ring constituting a terminus for the rear end of the shell, but separate therefrom, axially directed hollow legs extending forwardly from said terminus, guide tubes in the rear end of the shell receiving said legs and guiding the terminus for longitudinal movement, to open a gap of varying width between the shell and the terminus by relative rearward movement of the latter, cooperating ports in the guide tubes and the legs, which when in registry afford communication between the gas duct and the interior of the hollow ring, a plurality of individual rearwardly directed jets distributed about the hollow ring and leading from its interior, a plurality of gas stream divider vanes distributed in a circle about the gas duct and supported from the engine housing and movable between a retracted position, wherein they are out of the gas stream, and a projected position within the gas stream and forward of the gap, wherein they are disposed transversely of the nozzle, said vanes being spaced apart and shaped to divide the issuing gas stream into a plurality of smaller individual jets when the vanes are in their projected position, the circumambient air entering through the gap and passing through the spaces between the vanes acting to maintain separation between such individual jets, thrust reversing flaps also distributed about and supported from the engine housing and movable between a retracted position, wherein they are out of the gas stream, and a projected position behind the gap, wherein they are disposed transversely of the nozzle, said flaps being shaped to collectively block exit of gases through the nozzle when they are in projected position, and to direct the gases outwardly and forwardly through the gap, means which shift the terminus into its several gap-forming positions, in one of which the ports are in registry, and in a second of which the ports are out of registry, means which shift the vanes into projected position when the ports are in registry, and means which shift the flaps into projected position when the terminus is in such second gap-forming position, and the ports are out of registry.

10. A combined noise suppressor and thrust reverser for use with a gas stream reaction engine, comprising, in combination with an engine housing including an exterior shell enclosing a gas duct and open at its rear end to define a jet nozzle for discharge of gases from the gas duct, an annular terminus separate from and guided upon the rear end of said shell and movable longitudinally relative thereto, and by such movement in the rearward sense opening an annular gap of varying width between itself and the rear end of the shell, a plurality of gas stream divider vanes distributed in a circle about the gas duct and supported from the engine housing for movement between a retracted position, wherein they are out of the gas stream, and a projected position within the gas stream and forward of the gap, wherein they are disposed transversely of the nozzle, said vanes being spaced apart and shaped to divide the issuing gas stream into a plurality of smaller individual jets when the vanes are in their projected position, the circumambient air entering through the gap and passing through the spaces between the vanes acting to maintain separation between such individual jets, thrust reverser flaps distributed about the gas duct and supported upon the terminus and movable between a retracted position, wherein they are out of the gas stream, and a projected position behind the gap, wherein they are disposed transversely of the nozzle, said flaps being shaped to collectively block exit of gases through the nozzle when they are in projected position, and to direct the gases outwardly and forwardly through the gap, means which shift the terminus into and from a plurality of gap-forming positions, means which shift the vanes into projected position corresponding to a first gap-forming position of the terminus, and means interconnecting the shell and the flaps, to move the latter into projected position by movement of the terminus rearwardly beyond such first gap-forming position to a second wider gap-forming position, said interconnecting means including lost motion mechanism enabling rearward shifting of the terminus into its first gap-forming position without accompanying movement of the flaps.

11. The combination of claim 10, wherein the thrust reverser flaps are pivoted, on axes generally tangential with respect to the nozzle, about the forward inner edge of the terminus, and in retracted position contact the inner peripheral surface of the terminus, the means interconnecting the shell and the flaps including a link pivoted at its rear end to a flap, outwardly of the latter's pivot axis, and a slotted guide on the shell engaging the forward end of said link, to enable relative movement of the terminus and shell without projection of the flaps, until the forward end of the link bottoms in its slotted guide.

12. A combined noise suppressor and thrust reverser for use with a gas stream reaction engine, comprising, in combination with an engine housing including the exterior shell, the tail cone, and the intervening gas duct of such engine leading to a rearwardly directed annular nozzle at the rear end of the shell, an annular terminus separate from and guided upon the gear end of the shell and movable longitudinally relative thereto, and by such movement in the rearward sense opening an annular gap between itself and the rear end of the shell, a plurality of gas stream divider vanes distributed in a circle about the gas duct and supported from the engine housing and movable between a retracted position, wherein they are out of the gas stream, and a projected position ahead of the gap, wherein they are disposed transversely of the nozzle and communicate with the gap for intake of circumambient air, said vanes being spaced apart and shaped to divide the issuing gas stream into smaller individual jets, and the gap-admitted air passing through the spaces between them to maintain separation between such individual jets, thrust reverser flaps also distributed about the gas duct and supported from the engine housing and movable between a retracted position, wherein they are out of the gas stream, and a projected position behind the gap, wherein they are disposed transversely of the nozzle and communicate with the gap, said flaps being distributed about the gas duct and shaped to collectively block exit of gases through the nozzle and to direct them outwardly and forwardly through the gap, and means which move the terminus into its several positions, and the vanes and flaps respectively between their projected and retracted positions, and which shift the tail cone in the axial direction to vary the nozzle area.

13. The combination of claim 12, wherein the stream divider vanes are pivotally mounted upon the tail cone, to pivot about generally tangentially directed axes about the tail cone.

14. The combination of claim 12, wherein the thrust reverser flaps are pivotally mounted upon the terminus, to pivot about generally tangentially directed axes about the forward, inner edge of the terminus.

15. The combination of claim 12, including means which shift the tail cone axially with respect to the remainder of the engine housing, to vary the cross-sectional area of the nozzle independently of the adjusted position of the terminus.

References Cited in the file of this patent

UNITED STATES PATENTS

| | | |
|---|---|---|
| 2,648,192 | Lee | Aug. 11, 1953 |
| 2,841,954 | Rainbow | July 8, 1958 |
| 2,845,775 | Tyler et al. | Aug. 5, 1958 |
| 2,865,169 | Hausmann | Dec. 23, 1958 |
| 2,886,946 | Parker | May 19, 1959 |
| 2,931,171 | Tyler et al. | Apr. 5, 1960 |

FOREIGN PATENTS

| | | |
|---|---|---|
| 56,672 | France | July 23, 1952 |
| | (Addition to No. 943,820) | |
| 103,325 | Great Britain | Jan. 19, 1917 |
| 165,369 | Australia | Sept. 24, 1953 |
| 733,727 | Great Britain | July 20, 1955 |
| 997,262 | France | Sept. 12, 1951 |
| 1,092,654 | France | Nov. 10, 1954 |